June 12, 1934.  J. M. CHRISTMAN  1,962,174
INJECTION DEVICE TESTING MACHINE
Filed March 4, 1931  2 Sheets-Sheet 1
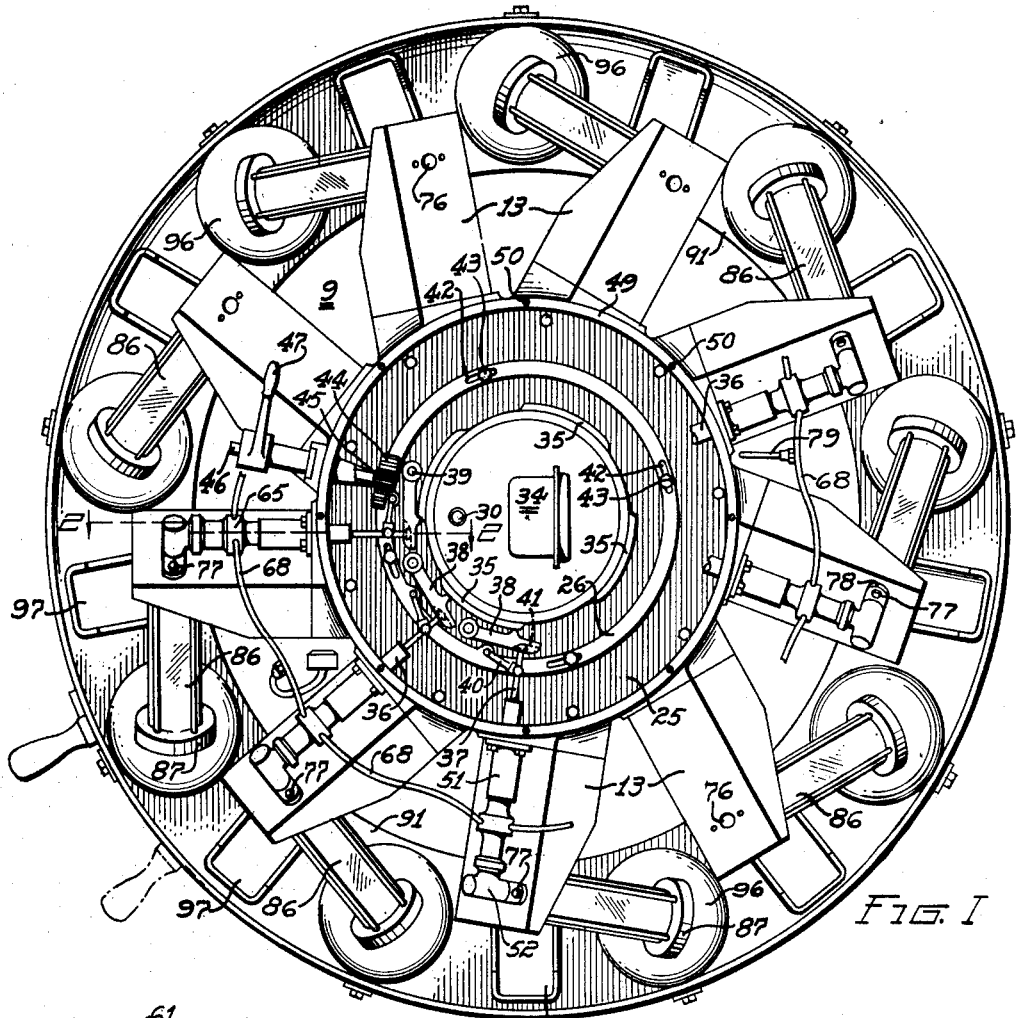

June 12, 1934.  J. M. CHRISTMAN  1,962,174
INJECTION DEVICE TESTING MACHINE
Filed March 4, 1931   2 Sheets-Sheet 2
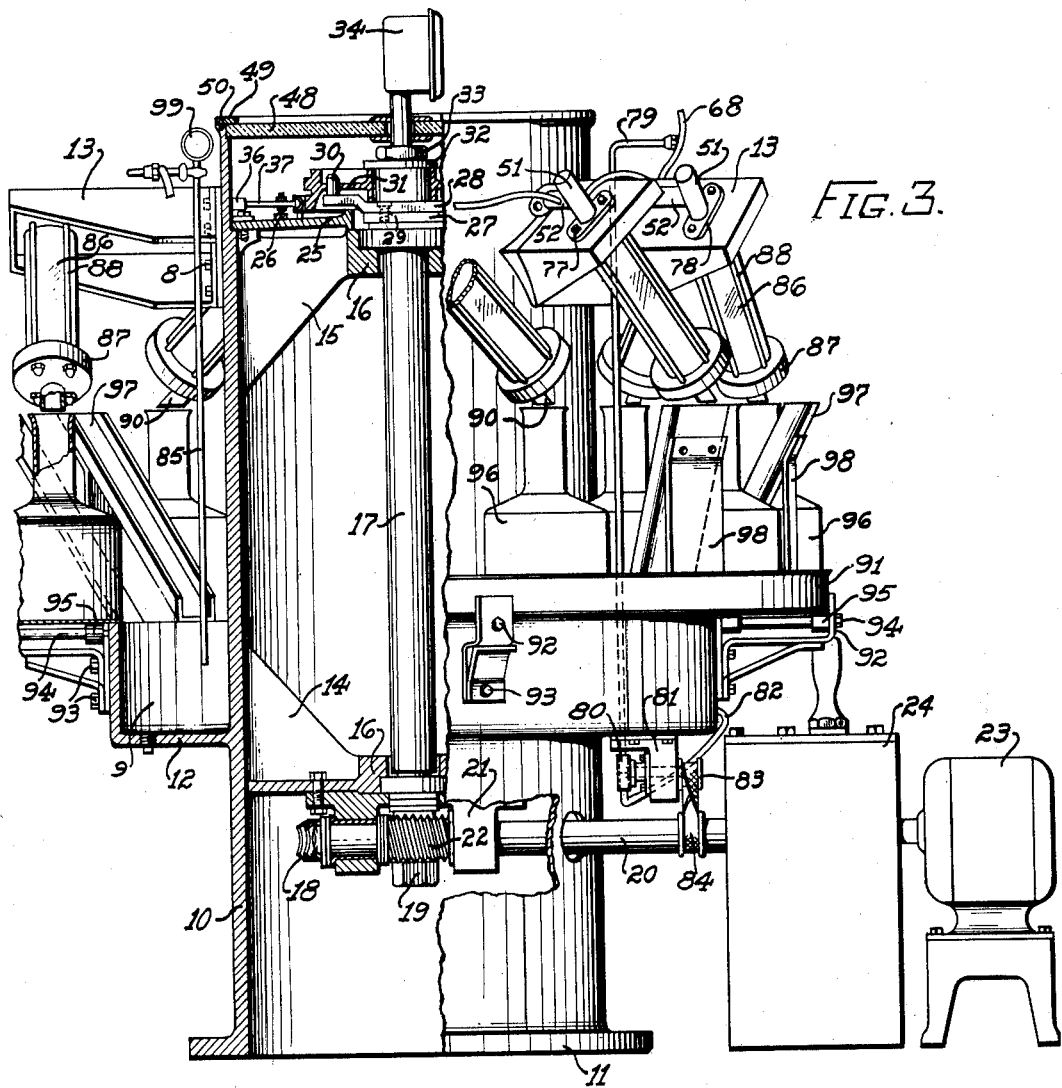
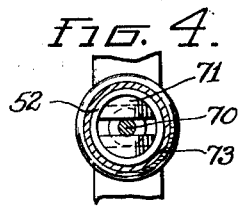
Inventor
JOHN M. CHRISTMAN
By
Attorney Patented June 12, 1934

1,962,174

UNITED STATES PATENT OFFICE 1,962,174

INJECTION DEVICE TESTING MACHINE

John M. Christman, Detroit, Mich., assignor to Packard Motor Car Company, Detroit, Mich., a corporation of Michigan Application March 4, 1931, Serial No. 520,103

17 Claims. (Cl. 73—51)

This invention relates to testing machines and more particularly to machines for testing fuel injection devices employed with engines of the Diesel type.

An object of the invention is to provide a machine for testing a fuel injection device for Diesel engines under its actual operating conditions as associated with the engine so that the quantity of fuel delivered and the character of the spray of the dispensed fuel can be observed preparatory to installation with the engine.

Another object of the invention is to provide a testing machine for the fuel injection devices of a Diesel engine which permits the character of the fuel spray to be observed and at the same time provides for the measurement of the quantity in the injections discharged.

A further object of the invention is to provide a testing machine with which the fuel injection devices of a multi-cylinder Diesel engine can be simultaneously tested in their actual working conditions prior to their application to the engine.

Other objects of the invention will appear from the following description taken in connection with the drawings, which form a part of this specification, and in which:

Fig. 1 is a plan view of a testing machine incorporating my invention;

Fig. 2 is a vertical sectional view of the machine, taken on line 2—2 of Fig. 1;

Fig. 3 is an elevational view of the machine, partly broken away and in section.

Fig. 4 is a sectional view taken on line 4—4 of Fig. 2.

Referring now to the drawings by characters of reference, 10 indicates a cylindrical frame standard having a flanged base portion 11 upon which it is supported. Surrounding the lower portion of the standard is an angular wall 12, preferably formed integrally with the standard, which provides a sump 9 for a purpose which will be later described. Around the upper portion of the standard is arranged radially extending bracket means, which consist of a plurality of arms 13 secured by bolts 8. A wall 14 extends transversely across the lower portion of the frame standard, while a skeleton reinforcing wall structure 15 extends transversely across the upper interior portion of the cylindrical frame. The wall structures 14 and 15 are provided with axially aligned hubs 16 through which the driven shaft 17 extends and suitable bearings are interposed between the shaft and such walls. This shaft has a gear 18 fixed to the end projecting below the wall 14 which is held axially on the shaft by the nut 19. A drive shaft 20 extends transversely into the lower portion of the frame and is supported by a pair of arms extending from a bearing member 21 which is secured to the under side of the wall 14. A worm gear 22 is fixed upon the drive shaft 20 so that it meshes with the gear 18 on the driven shaft 17. The drive shaft 20 is driven by the electric motor 23 and a suitable change speed gearing is associated with the shaft within the housing 24.

A diaphragm wall 25 rests upon the upper portion of the skeleton wall structure 15 and is arranged to enclose the standard therebelow and to also carry a control ring 26 to be hereinafter referred to. The shaft is formed with a flange 27, and telescoping the shaft and resting upon the flange is a carrier member 28, suitable bolts, as indicated at 29, being used to secure the carrier member to the flange 27 of the driven shaft. The carrier member is provided with an upstanding boss 30 arranged to project through an opening in the cam 31 which telescopes the driven shaft and is supported by the carrier member. A retainer 32 holds the cam axially upon the driven shaft and a nut 33 is screwed upon the driven shaft to secure the retainer in desired position. Associated with the upper end of the driven shaft is a tachometer 34, of a conventional type, by means of which the revolutions of the cam 31 and the shaft 17 are registered. The cam 31 is similar in form and design to the cam which is employed in the engine with which the fuel injection devices are to be associated, and as indicated there are four lobes 35 on the cam.

The bracket arms 13 are associated with the frame standard in a radial relation corresponding to the manner in which the engine cylinders are associated with the crank case of a radial type of engine, and this machine is designed more particularly for the testing of the fuel devices employed with a nine cylinder radial type of engine in which there is an individual fuel injection device associated directly with each cylinder and which is also provided with actuating mechanisms which extend radially into the crank case to be operated by a centrally arranged cam.

Housings 36 extend radially through the upper portion of the frame and articulated push rods 37 extend through such housings, such housings being detachably secured by bolts 74. The push rods are in alignment with the bracket members 13 and engage rock levers 38 which are mounted on pivot pins 39 carried by the diaphragm wall 25. A link 40 connects each of the inner ends of the articulated push rod structures with the ring 26 and rotation of such ring will move the push rods longitudinally of the curved surface 41 on the rock levers so that the stroke of the push rods can be varied. The ring 26 is provided with elongated arcuate slots 42 through which retaining bolts 43 extend, such bolts being secured to the diaphragm wall 25.

The ring is rotated through mechanism which extends to the exterior of the frame. A rack 44 is fixed to the ring and a pinion 45 meshes with the rack and is fixed to a shaft 46 which extends through the frame and has secured to the exterior end thereof a lever 47 by means of which it can be rotated. Rotation of the shaft through means of the lever will transmit rotation to the regulating ring 26 through means of the meshing pinion and rack.

A transparent end wall 48 is seated in a groove formed in the upper end of the frame standard and a molding ring 49, secured to the upper end of the frame by screws 50, removably secures the transparent end wall in position. By the provision of this type of end wall, the action of the cam, the rock levers and the push rods can be readily observed.

The injection devices to be tested by the machine are disposed exteriorly of the frame and consist of a nozzle section 51 and a pump section 52. The nozzle section includes a housing 53 having an axial passageway 54 therein. An extension 55 is screwed into an end of the nozzle casing and is provided with an axially extending passage which is in open communication with the passageway 54. Through each of the axial passages in the nozzle casing and its extension there is a valve member 56 having a head portion 110 cooperating with the fluid outlet end of the passage through the extension and having a retainer member 57 screwed upon its other end and adapted to reciprocate within the passageway 54. This valve is substantially of the same diameter as the major portion of the passage through the nozzle extension and is provided with axially extending grooves to provide communication between the passageway 54 and the flared outlet end of the extension passage. A spring 58 is arranged within the passageway 54 surrounding the valve and normally moves the retainer and the valve in a direction such that the valve head tends to close the outlet end of the nozzle. A plug 59 is screwed into the end of the nozzle casing, remote from the nozzle extension, and a stop member 60 is screwed into such plug so that it extends a desired distance within the passageway 54 and provides a stop member to limit the degree to which the valve head can approach the nozzle extension when in its nearest closed position. This stop member prevents contact of the valve head with the wall forming the flared outlet end of the passage through the extension. A removable cap 61 is screwed upon the plug and upon its removal the stop member can be adjusted. For a better understanding of the injection device and actuating mechanism therefore, herein referred to, attention is invited to the pending application of Lionel M. Woolson, Serial No. 358,899, filed April 29, 1929.

A pump casing 62 is screwed upon a neck portion extending perpendicularly from the axis of each nozzle housing and is provided with a pump barrel 63 which is held in position therein by a bearing member 64 against which the end of the neck engages. The nozzle neck and the bearing member are provided with passages which establish communication between the passageway in the nozzle housing and the interior of the pump barrel. A circular housing 65 is wedged upon the pump barrel and is held in wedged relation by a nut 66 which screws upon a threaded portion of the pump casing. This circular housing surrounds the pump casing and a portion of the barrel and a plurality of radially extending passages 67 extend through the pump casing and the barrel to establish communication between the circular housing and the interior of the barrel. Suitable conduit sections 68 are provided to connect the adjacent circular housings and provide therewith a manifold through which fuel oil is fed to the several injection devices while being tested by the machine. Check valves 69 are arranged in the passage through the bearing member 64 and prevent back flow of fuel into the pump barrel from the nozzle. A plunger 70 is arranged to reciprocate within the pump barrel and a guide member 71 is arranged to reciprocate in the pump casing, such guide member being detachably secured to the end of the plunger projecting from the barrel. A coil spring 72 is arranged intermediate the barrel and the pump casing and engages the guide member 71 to normally urge the pump plunger in a direction to uncover the passages 67.

Retaining sleeves 73 telescope the exterior ends of the bearing members 36, and the pump casings are partially enclosed and supported by such sleeves when they are associated for the purpose of being tested. The ends of the push rods 37 extending through the frame have an adjustable section 75 secured to the end thereof which engages with the guide members 71 with which the plungers are connected. The brackets 13 are provided near their outer ends with a port 76 which is adapted to receive the nozzle extension, and the injection device is detachably secured through means of bolts 77 which clamp flanges 78 extending from the nozzle extensions against the upper face of the bracket when the nozzle extension is arranged to extend through the ports 76. In this manner the injection devices are fixed to the machine in a relation such that fuel charges are injected below the bracket walls and the pump sections are arranged in a relation to be actuated by the push rod structures which extend through the machine frame.

As before stated, the injection devices are associated with the frame in a manner similar to that in which they are to be associated with an engine, and the fuel feeding manifold connects the several injection devices in substantially the same manner as they are connected when assembled with the engine to which they are to be applied. The cam, the rock levers, the push rods, and the push rod adjusting mechanism are substantially identical with that employed with the engine to which the injection devices are to be applied, so that upon actuation of the cam and the fuel feeding system the injection devices can be actuated just as they are when assembled with the engine to which they are later attached.

The fuel feeding manifold is connected by a conduit 79 with a low pressure pump housing 80 which is fixed to the bracket 81 secured to the sump wall 12. Leading to the pump is a conduit 82 which is in communication with the lower portion of the sump 9. A shaft 83 extends through the bearing 81 and is arranged to drive suitable pump gears within the pump housing, such shaft being rotated by means of a belt 84 which is driven by the shaft 20. Whenever the shaft 20 is rotating the cam which actuates the pump plungers, the gear pump for circulating fuel oil through the manifold leading to the injection devices will also be operated. The fuel feeding system is arranged to have a larger capacity than that required by the ejection of fuel charges from the injection devices, and the overflow from the manifold is conducted into the sump by means of a conduit 85. It will thus be seen that there is a continuous flow of fuel oil through a circuit which includes the sump, the conduit 82, the pump housing 80, the feeding conduit 79, the fuel feeding manifold connected with the several pump casings and the return conduit 85 so that the fuel oil can be used over and over again with this type of machine. In order to maintain a low pressure in the manifold, I provide a valve 81 which controls the quantity of fuel passing into the return conduit 85, and a gauge 99 is connected with the manifold to show the pressure therein.

Fuel oil circulates through the fuel feeding manifold under a low pressure so that when the plungers 70 of the injection devices uncover their associated passages 67, then the barrel portions beyond the end of the plungers will be filled with fuel oil. The spring pressed ball valves 69 are seated with sufficient force so that they are not opened by the force of the fuel flowing through the manifold and into the open ports 67. When the plungers are moved toward the passages 67 by the push rods 37, oil will be displaced from the pump barrels through the ports 67 back into the fuel feeding manifold, however no oil will return from the nozzle section of the injection device due to the check valves. The delivery end of the pump barrels will always be filled with oil immediately after the plungers 70 have uncovered the passages 67 upon their return from an injection stroke. The injection of fuel from the nozzles takes place only after the plungers have closed the passages 67 and the length of the plunger strokes beyond such passages, after closing the same, determines the quantity of liquid fuel which is dispensed from the nozzle. The desired amount of fuel to be ejected from the nozzles can be regulated through the control mechanism previously described consisting of the lever 47, the shaft 46, the pinion 45 and the rack 44, because such mechanism will rotate the ring 26 and this ring in turn will move the links 40 therewith so that the angular relation of the inner section of the articulated push rod structure 37 is changed longitudinally with respect to the rock levers. The rock levers are provided with a curved bearing face 41 so that adjustment of the push rod sections along such face will change the length of effective stroke imparted to the pump plungers when the cam rotates, it being understood that the cam rocks the rock levers the same degree under all circumstances.

In order that atomization of the fuel charges delivered by the injection devices may be observed, I provide transparent vessels. These vessels each consist preferably of a glass shell 86 and an end wall 87 which holds the shell tightly against the under face of a bracket, a plurality of bolts 88 extending through the end wall exteriorly of the shell and being screwed into the bracket wall for this purpose. These end walls are each provided with an outlet port 89 from which extends a spout 90. The vessels described are detachably secured to the brackets and are arranged to receive the fuel injections after they leave the nozzles, and it is apparent that the type of atomization being delivered by the various nozzles can be readily observed.

In order that the amount of fluid being dispensed by the nozzles can be measured, I provide means for collecting the fuel discharge in a manner such that it can be weighed and the amount of each fuel discharge thereby determined so that the devices can be adjusted for delivering the desired quantity of fuel prior to their association with an engine. To this end I provide a shelf means 91 which encircles the frame and is rotatably mounted upon the upper edge of the wall 12, forming the sump, and brackets 92 which are secured and extend from the upstanding portion of the wall 12. Such brackets are secured by bolts 93 and 94 to the wall 12, and rollers 95 are mounted upon the bolts 94 to provide a bearing for the inner and outer edges of the under side of the rotatably mounted shelf, while the upper end of the brackets project adjacent the sides of the shelf to prevent its lateral displacement. Upon the shelf containers 96 are arranged so that their spouts will be directly beneath the spouts of the vessels, and the fuel oil draining from the vessels will flow into such containers. These containers, after the machine has been running a predetermined length of time, can be removed and weighed with their contents, and the total weight of the oil collected in the containers can be divided by the number of injections so that the weight of each injection can be calculated. By this method it can be determined whether each of the injection devices is delivering the proper quantity of fuel and, if not, they can be removed from the brackets and adjusted until they do deliver the proper quantity of oil. In this way the injection devices are tested and adjusted so that their performance will be correct before they are assembled with the engine to which they are to be attached.

If only observation of the charge is desired, the shelf can be rotated so that the containers 96 are midway between the injection devices, and when the shelf is in such relation, troughs 97 extend adjacent the spouts 90 of the vessels in a relation to guide oil draining from the vessels into the sump 9. These troughs 97 are fixed to the rotatable shelf by brackets 98 which are welded thereto and to the bottom of the shelf.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a machine for testing an engine fuel injection device having a pump and a nozzle, a frame, an arm extending from the frame, said arm and frame being formed to support the injection device with the nozzle outlet extending through the arm, fuel feeding means leading to the injection device, means carried by the frame for actuating the injection device in the same manner as when applied to an engine, and a transparent vessel associated with the arm to receive the fuel injections from the nozzle.

2. In a machine for testing engine fuel injection devices each including a nozzle and a pump, a support, means for fixing the injection devices to the support, a transparent vessel associated with the support to surround and project from the outlet end of each nozzle, means for feeding fuel to the injection devices, and means for actuating the pumps to force fuel through the nozzles in a manner similar to that employed when the nozzles are associated with an engine.

3. In a machine for testing engine fuel injection devices each having a nozzle and pump, under conditions corresponding to actual working conditions, a frame, a plurality of arms projecting from the frame, each of said devices being fixed to an arm and the frame with the nozzle projecting below the arm, fuel feeding means associated with the devices, driven means within the frame associated to actuate the pumps of the devices in the same manner as when assembled with the engine, and receptacles associated to receive the fuel injections issuing from the nozzles.

4. In a machine for testing engine fuel injection devices each having a pump section and a nozzle section with valve adjusting means, a frame, apertured bracket means associated with the frame, said devices being fixed to the frame and brackets with the pumps adjacent the frame and the nozzles having their outlets projecting through the apertures in the brackets, means for feeding liquid fuel to the devices, receptacles associated with the machine for receiving injections issuing from the nozzles, said nozzle valves being accessible for adjustment while fixed to the machine, and mechanism carried by the frame and associated to actuate the pumps of said devices in a manner corresponding to their engine actuating mechanism.

5. In a machine for testing engine fuel injection devices each including a pump and nozzle, a frame, bracket means projecting from the frame, shelf means projecting from the frame in a plane beneath the bracket means, said devices being detachably fixed to the frame and bracket means with the nozzle outlet projecting beneath the bracket means, means for supplying liquid fuel to the devices, an individual receptacle supported on the shelf means beneath each nozzle for collecting the fuel discharged from the nozzles, means for conducting fuel discharges from the nozzles to the receptacles, said receptacles being removable from the shelf means for weighing, and means carried by the frame and associated to actuate the pumps of the devices in a similar manner as when associated with the engine.

6. In a machine for testing engine fuel injection devices each including a pump and nozzle, a frame, apertured bracket means projecting from the frame, rotatable shelf means associated with the frame in a plane below the means, said injection devices being associated with the bracket means and the frame with the nozzle outlet ends projecting through the apertures in the bracket means, means carried by the frame and associated to actuate the pumps of the injection devices in the same manner as when assembled with an engine, means for feeding fuel to the injection devices, removable receptacles adapted to be mounted upon the shelf means, a sump means carried by the frame and communicating with the fuel feeding means, vessels having outlet spouts, said vessels being associated with the bracket means to enclose the outlets of the nozzles, and trough means carried by the shelf means and leading to the sump means, said spouts being adapted to direct fuel from the nozzles into either the receptacles or the trough means depending upon the adjustment of the rotatable shelf means.

7. In a machine for testing engine liquid fuel injection devices having nozzle sections, a frame, apertured bracket means extending laterally from the frame, the nozzle sections of said devices being fixed to the bracket means with their outlet ends projecting downwardly through the apertures in the bracket means, means for feeding liquid fuel to said injection devices, mechanism carried by the frame associated to actuate the devices to project fuel charges from the nozzles, a detachable transparent vessel enclosing the outlet end of each nozzle, said vessels having open outlet drain spouts, means for securing the vessels to the under side of the bracket means, and means associated in relation with the vessel spouts for receiving the fuel draining therefrom.

8. In a machine for testing engine liquid fuel injection devices having nozzle sections, a frame, bracket means extending from the frame, the nozzle sections of said devices being fixed to the bracket means, means for feeding liquid fuel to said devices, sump means associated with said frame, conduit means connecting the sump means with the fuel feeding means, transparent vessels associated with said bracket means and arranged to enclose the outlet ends of the nozzles, and means for conducting fuel from the vessels to the sump means.

9. In a machine for testing engine liquid fuel injection devices having nozzle sections, a frame, bracket means extending from the frame, the nozzle sections of said devices being fixed to the bracket means, means for feeding liquid fuel to said devices, sump means associated with said frame, conduit means connecting the sump means with the fuel feeding means, transparent vessels associated with said bracket means and arranged to enclose the outlet ends of the nozzles, and an individual trough for conducting fuel from each vessel to the sump means.

10. In a machine for testing engine liquid fuel injection devices including nozzle sections, a frame, apertured bracket means extending from the frame, the nozzle sections being fixed to the bracket means with their outlet ends projecting downwardly through the apertures in the bracket means, means for feeding liquid fuel to said injection devices, mechanism carried by the frame and associated to actuate the devices to project fuel charges from the nozzles, transparent vessels enclosing the outlet ends of the nozzles and having drain ports, a shelf below the vessel ports and rotatably associated with the frame, containers adapted to be carried by the rotatable shelf, trough means fixed to the rotatable shelf and adapted to be associated below the ports of the vessels, and a sump in the frame with which the troughs are related to drain fuel from the vessels when the shelf is rotated to place the trough means beneath the ports of the vessels.

11. In a machine for testing liquid fuel injection devices including nozzle sections, a frame, apertured bracket means extending laterally from the frame, the nozzle sections being fixed to the bracket means with their outlet ends projecting downwardly through the apertures in the bracket means, means for feeding liquid fuel to said injection devices, mechanism carried by the frame and associated to actuate the devices to project fuel charges from the nozzles in a manner similar to that employed by the engine with which the nozzles are to be associated, transparent vessels enclosing the outlet ends of the nozzles and having drain ports, a flanged wall extending from the exterior of the frame and providing a sump, a shelf rotatably mounted on said flanged wall, and means for directing fuel draining from the outlet ports of the vessels into the sump.

12. In a machine for testing liquid fuel injection devices including fuel charge projecting nozzle sections and pump sections, a frame, apertured bracket means extending laterally from the frame, the nozzle sections being fixed to the bracket means with their outlet ends projecting through the apertures in the bracket means, manifold means associated with the injection devices, means for forcing liquid fuel through the manifold into the nozzles, means for collecting the fuel charges projected from the nozzles including a sump associated with the frame, and an overflow connection leading from the fuel feeding manifold into the sump.

13. In a machine for testing engine liquid fuel injection devices each including a nozzle and a pump section, an apertured cylindrical frame, apertured bracket means extending laterally from the frame, the fuel injection devices being detachably fixed externally of the frame with the nozzle outlet projecting through the apertures in the bracket means, means for feeding liquid fuel to said injection devices, means for collecting the fuel charges projected from the nozzles, push rods extending radially through the apertures in the frame and engaging the pumps of the injection devices exteriorly of the frame, and mechanism carried interiorly of the frame and associated to actuate the push rods.

14. In a machine for testing engine liquid fuel injection devices each comprising an associated nozzle and pump section, a hollow, apertured, cylindrical frame, apertured bracket means secured to the frame and extending radially therefrom adjacent the upper end thereof, said injection devices being detachably secured exteriorly of the frame with their nozzle sections projecting through the apertures in the bracket means and their pump portions adjacent the frame, means for feeding fuel to the injection devices, means for collecting fuel discharged from the injection devices, a cam arranged interiorly of the frame, push rods extending through the apertures in the frame in operative relation with the pumps of the fuel injection devices, rock levers intermediate the push rods and the cam and with which the cam and the push rods engage, and driven means within the frame for rotating the cam.

15. In a machine for testing engine liquid fuel injection devices each comprising an associated nozzle and pump section, a hollow, apertured, cylindrical frame, apertured bracket means secured to the frame and extending radially therefrom adjacent the top thereof, said injection devices being detachably secured exteriorly of the frame with their nozzle sections projecting through the apertures in the bracket means and their pump portions adjacent the frame, means for feeding fuel to the injection devices, means for collecting fuel discharged from the injection devices, a cam arranged interiorly of the frame, push rods extending through the apertures in the frame in operative relation with the pumps of the fuel injection devices, rock levers intermediate the push rods and the cam and with which the cam and the push rods engage, driven means within the frame for rotating the cam, a wall within the frame, and means including an adjustable ring for varying the relation of the push rods with the rock levers to regulate the injection stroke of the pumps of the injection devices, said ring being movably carried by said wall interiorly of the frame.

16. In a machine for testing engine liquid fuel injection devices each comprising an associated nozzle and pump section, a hollow, apertured, cylindrical frame, apertured bracket means secured to the frame and extending radially therefrom adjacent the top thereof, said injection devices being detachably secured exteriorly of the frame with their nozzle sections projecting through the apertures in the bracket means and their pump portions adjacent the frame, means for feeding fuel to the injection devices, means for collecting fuel discharged from the injection devices, a cam arranged interiorly of the frame, push rods extending through the apertures in the frame in operative relation with the pumps of the fuel injection devices, rock levers intermediate the push rods and the cam and with which the cam and the push rods engage, driven means within the frame for rotating the cam, a wall within the frame, means including an adjustable ring for varying the relation of the push rods with the rock levers to regulate the injection stroke of the pumps of the injection devices, said ring being movably carried by said wall interiorly of the frame, and a removable transparent end for the frame adjacent the cam.

17. In a machine for testing engine liquid fuel injection devices each including associated nozzle and pump sections, an upstanding hollow, apertured, cylindrical frame, apertured bracket means extending radially from and adjacent the top of the frame, said injection devices being detachably secured to the frame with the nozzle outlets extending downwardly through the apertures in the bracket means, means for feeding fuel to the injection devices, means for collecting fuel discharged from the outlet ends of said injection devices, a driven shaft extending axially within the hollow frame, a carrier member fixed to the upper end of the shaft, a cam mounted on the shaft and fixed to the carrier member, push rods extending radially through the apertures in the frame in alignment with the pumps of the injection devices and associated to actuate the same, said push rods engaging the rock levers and said rock levers engaging the cam, means extending through the frame for regulating the push rods relative to the rock levers to vary the effective pump strokes, a removable closure for the upper end of the frame, and change speed mechanism for driving the axially extending shaft in the frame.

JOHN M. CHRISTMAN.